United States Patent [19]
Eavenson et al.

[11] Patent Number: 5,946,894
[45] Date of Patent: Sep. 7, 1999

[54] RIDING LAWN MOWER HAVING DESIRABLE WEIGHT DISTRIBUTION

[75] Inventors: Jimmy N. Eavenson, Aurora; Gerald Hobrath, Strongsville, both of Ohio

[73] Assignee: Commercial Turf Products, Inc., Streetsboro, Ohio

[21] Appl. No.: 09/002,989

[22] Filed: Jan. 5, 1998

[51] Int. Cl.⁶ .................................................. A01D 34/03
[52] U.S. Cl. .............................. 56/16.7; 56/15.4; 56/15.8
[58] Field of Search .................................... 56/15.4, 15.8, 56/15.9, 14.7, DIG. 22, DIG. 4; 180/308, 68.3; 280/834

[56] References Cited

U.S. PATENT DOCUMENTS

| | | | |
|---|---|---|---|
| 3,777,459 | 12/1973 | Elliott | 56/15.3 |
| 3,795,094 | 3/1974 | Mollen et al. | 56/11.1 |
| 4,120,136 | 10/1978 | Rose | 56/17.1 |
| 4,311,204 | 1/1982 | Shupert | 180/54 |
| 4,679,382 | 7/1987 | Saruhashi et al. | 56/10.1 |
| 5,355,665 | 10/1994 | Peter | 56/15.8 |
| 5,367,861 | 11/1994 | Murakawa et al. | 56/11.8 |
| 5,433,066 | 7/1995 | Wenzel et al. | 56/14.7 |
| 5,483,789 | 1/1996 | Gummerson | 56/15.5 |
| 5,507,138 | 4/1996 | Wright et al. | 56/14.7 |
| 5,600,944 | 2/1997 | Wright et al. | 56/14.7 |

*Primary Examiner*—Thomas B. Will
*Assistant Examiner*—Arpad Fabian Kovacs
*Attorney, Agent, or Firm*—Emerson & Associates; Roger D. Emerson; Timothy D. Bennett

[57] ABSTRACT

A riding mower is provided that includes a frame, an engine operatively attached to the frame and providing locomotion to the riding mower, a first front wheel operatively attached to the frame, a first back wheel operatively attached to the frame and a back axle forming a back axle axis. The first front wheel forms a front wheel axis and the first back wheel forms a back wheel axis. The back wheel axis is longitudinally spaced from the front wheel axis by a wheel base distance. The engine is longitudinally spaced forwardly of the back axle axis. In this way, the center of gravity of the riding mower is positioned relatively low and forward as compared to other known riding mowers. The first front wheel provides the front-most surface for the riding mower and the first back wheel provides the back-most surface for the riding mower.

14 Claims, 5 Drawing Sheets

RIDING LAWN MOWER HAVING DESIRABLE WEIGHT DISTRIBUTION

BACKGROUND OF THE INVENTION

1. Field of the Invention

This invention pertains to the art of method and apparatuses for a riding lawn mower, and more specifically to methods and apparatuses for arranging the weight distribution of a riding lawn mower in order to lower and move forward the center of gravity of the riding lawn mower.

2. Description of the Related Art

It is well known to provide riding lawn mowers having centers of gravity that are relatively high and towards the back of the mower. Such mowers typically have components extending behind the back wheels of the mower. These mowers have proven to be adequate for their intended purpose. However, when the center of gravity is positioned like this, it may create some problems.

One problem is that the overall length of the mower is relatively long. This can make zero turn mowers more difficult to control than required.

Another problem is that the overall weight of the commonly known mower is relatively high. This is necessary because extra weight must be added to the front of the mower to help in counter balancing the weight positioned near the back of the mower.

Still another problem with these riding mowers is that the portion of the mower extending behind the back wheels can easily scrape the ground whenever the mower is being driven over uneven terrain.

Still another problem of such known mowers is that their manufacture is more complicated due to the complexity of the frame. Such frames typically include various components that must be bolted together and also typically include various frame members that are bent at various angles.

The present invention provides methods and apparatuses for reducing these problems. The difficulties inherent in the art are therefore overcome in a way that is simple and efficient, while providing better and more advantageous results.

SUMMARY OF THE INVENTION

In accordance with one aspect of the present invention, a riding mower includes a frame, an engine for providing locomotion to the riding mower operatively attached to the frame, a first front wheel operatively attached to the frame, a first back wheel operatively attached to the frame, and a back axle that forms a back axle axis. The first front wheel forms a front wheel axis and the first back wheel forms a back wheel axis. The back wheel axis is longitudinally spaced from the front wheel axis by a wheel base distance. The engine is longitudinally spaced forwardly of the back axle axis. This moves the center of gravity of the engine and thus the center of gravity of the riding mower towards the front as compared to known riding mowers.

According to another aspect of the present invention, a riding mower includes a frame, an engine for providing locomotion to the riding mower operatively attached to the frame, a first front wheel operatively attached to the frame, a first back wheel operatively attached to the frame, a back axle that forms a back axle axis and an operator seat that is operatively attached to the frame. The first front wheel forms a front wheel axis and the first back wheel forms a back wheel axis. The back wheel axis is longitudinally spaced from the front wheel axis by a wheel base distance. The operator seat has a center of gravity with respect to the frame. This seat center of gravity is longitudinally spaced forwardly of the back axle axis by a seat axle distance. The seat axle distance divided by the wheel base distance forms a seat wheel base ratio that is within the range of 0.35 and 0.60. This moves the center of gravity of the seat and thus the riding mower towards the front as compared to known riding mowers.

According to still another aspect of the present invention, a riding mower includes a frame, an engine operatively attached to the frame and providing locomotion to the riding mower, a mower deck for use in mowing associated vegetation, a first front wheel operatively attached to the frame and a first back wheel operatively attached to the frame. The first front wheel provides a front-most surface for the riding mower and the first back wheel provides a back-most surface for the riding mower.

One advantage of the present invention is that the center of gravity is positioned relatively low and forward as compared to riding mowers known in the art.

Another advantage of the present invention is that the overall length is reduced. This is especially beneficial when the riding mower is a zero turn mower.

Another advantage of the present invention is that the overall weight is significantly reduced. This also reduces the footprint pressure of the riding mower, minimizing potential damage to the terrain caused by the riding mower.

Still another advantage of the present invention is that the hydrostatic transmissions are arranged in a co-linear fashion with the back axle.

Still another advantage of the present invention is that it is easy to manufacture, has increased structural strength, and is less expensive to manufacture, due to the straight structural tubing used to form the frame.

Still another advantage of the present invention is that it includes an articulating front frame member. This helps to maintain front wheels on the ground even while the riding mower travels over uneven terrain.

Still another advantage of the present invention is that the front wheels provide the front-most surface for the riding mower and that the back wheels provide the back-most surface for the riding mower.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
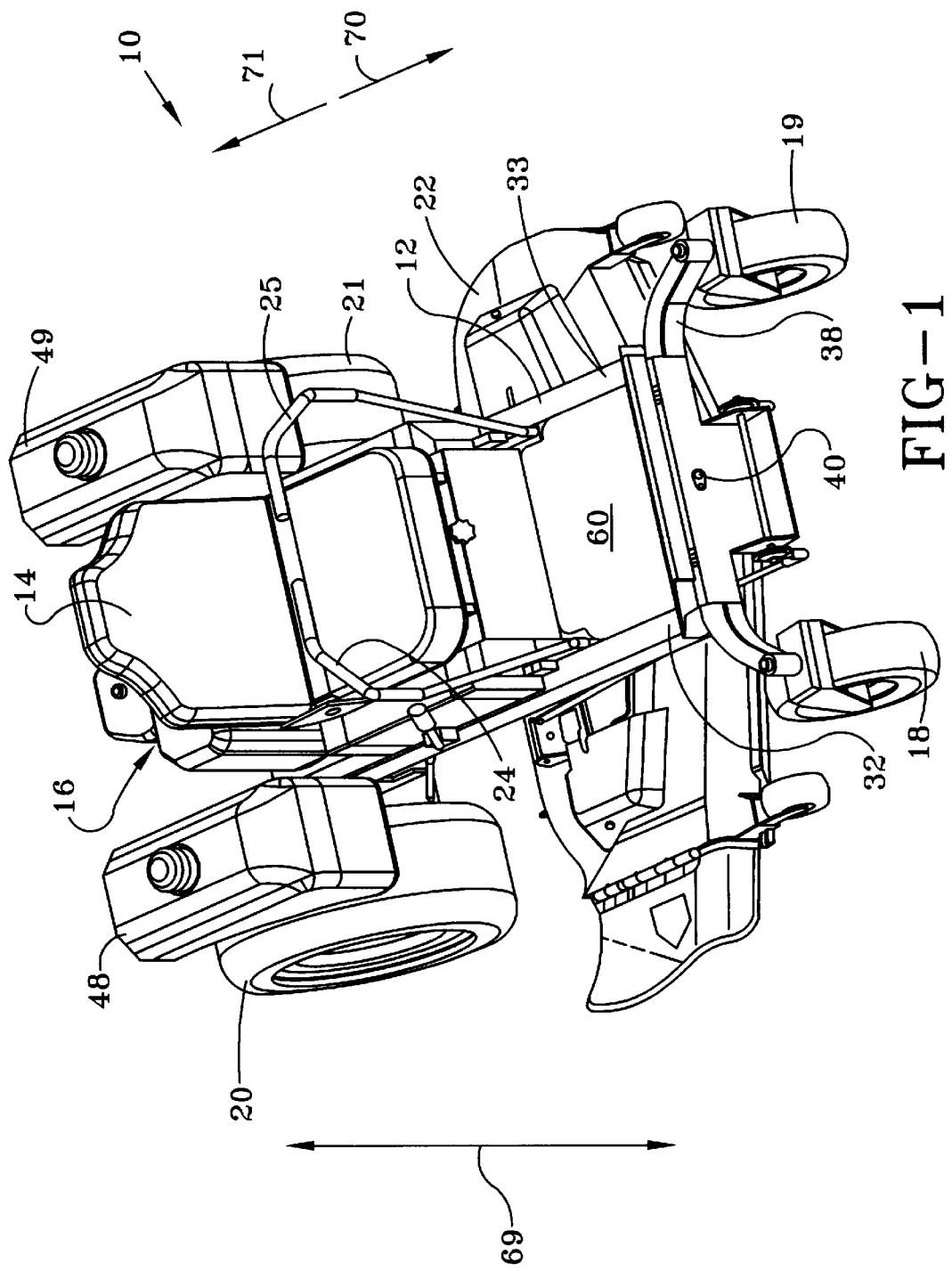
FIG. 1 is a perspective front view of the riding mower of the present invention.
Figure 2:
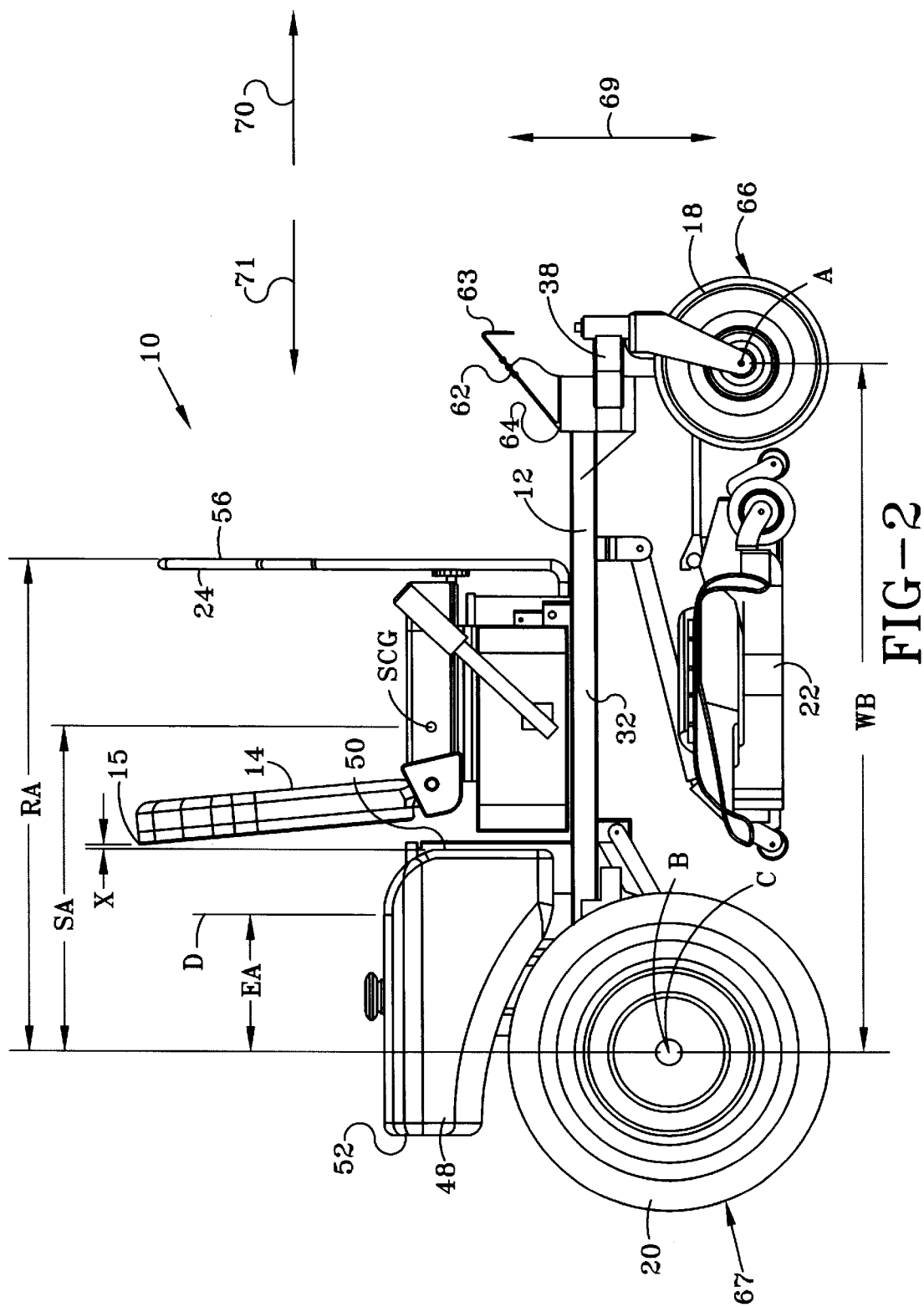
FIG. 2 is side elevation view of the riding mower of the present invention showing the wheel base distance and the distances between the back axle axis and the vertical shaft of the engine, the center of gravity of the operator seat and the leading edge of the control rods.
Figure 3:
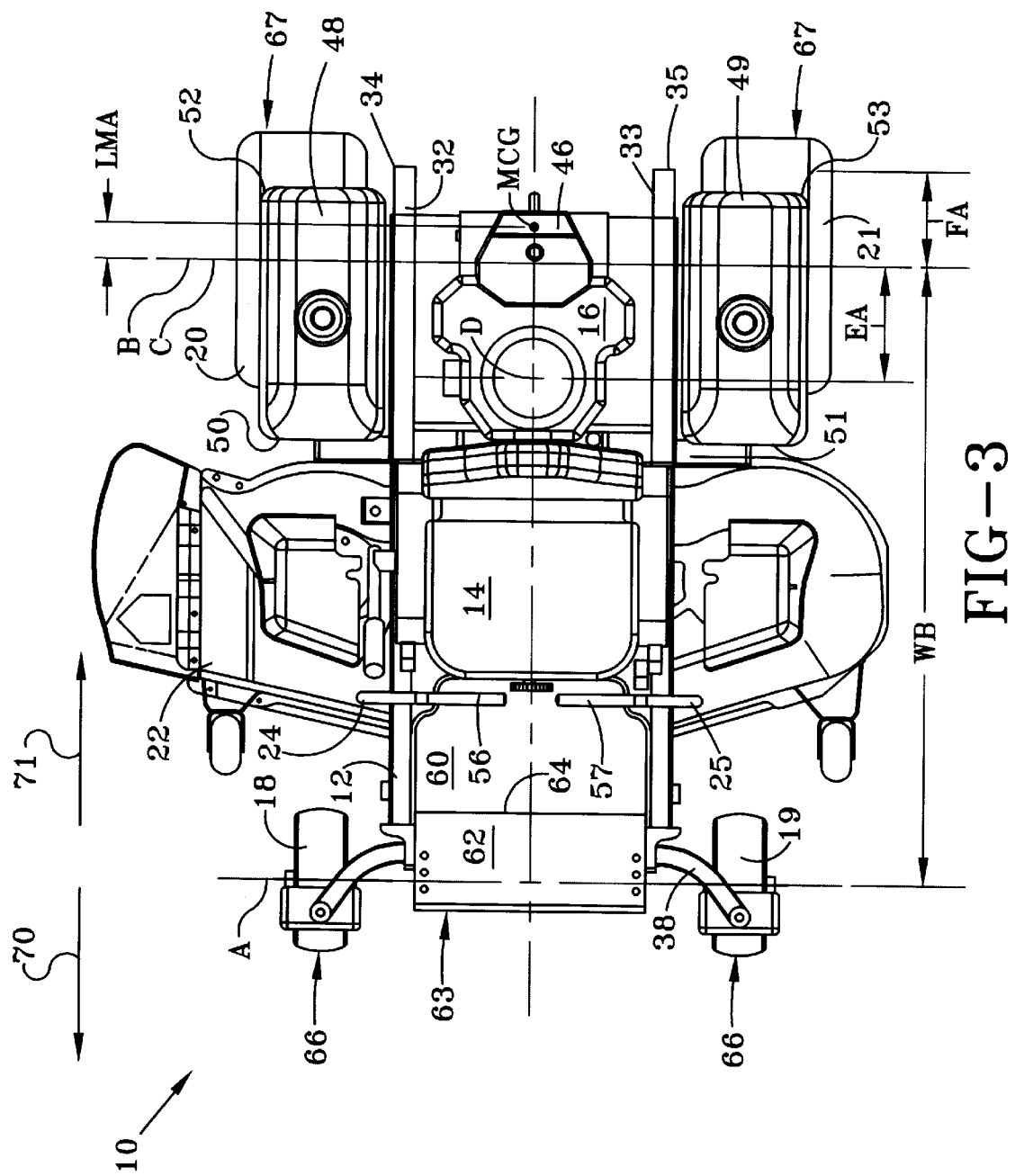
FIG. 3 is a plan view of the riding mower of the present invention showing the wheel base distance, the distance between the back axle axis and the center of gravity of the muffler, and the front and back-most surfaces of the riding mower.
Figure 4:
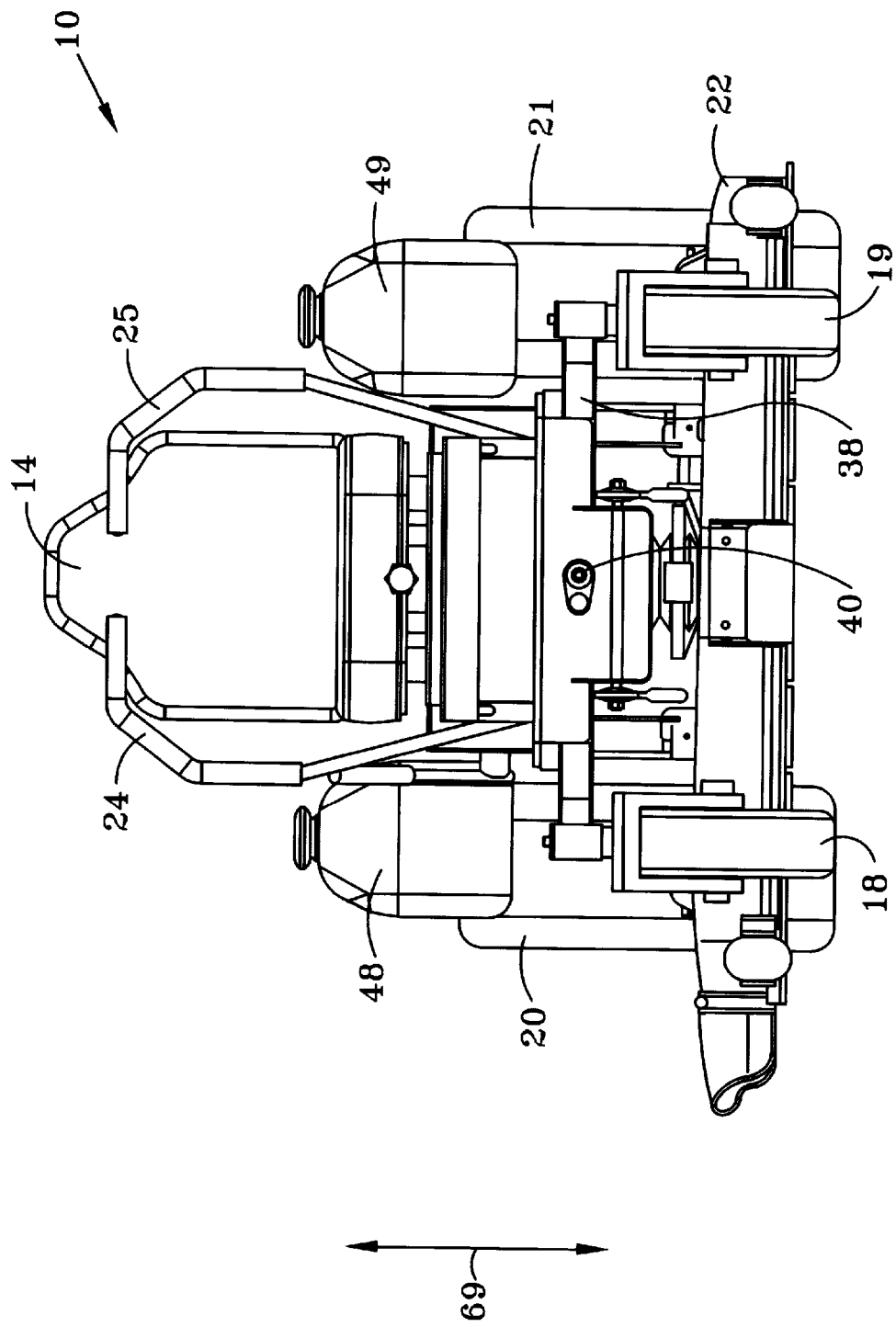
FIG. 4 is a front elevation view of the riding mower of the present invention showing the first and second control rods and the articulating pin around which the articulating front frame member pivots.

Referring now to the drawings, which are for purposes of illustrating a preferred embodiment of the invention only, and not for purposes of limiting the invention, FIGS. 1–5 show a riding mower 10 having a weight distribution in accordance with this invention. In general terms it is the purpose of this invention to move the center of gravity of the riding mower 10 relatively downward and forward as compared to other known riding mowers. This tends to minimize the overall length, the overall weight and the footprint pressure of the riding mower 10. Although this preferred embodiment is directed to a riding mower the invention is also applicable to other mowers, other vehicles and other applications as well. It should be noted that the riding mower 10 may be a zero turn mower. By zero turn mower it is meant that the riding mower 10 has zero radius turning capabilities. This will be discussed further below. Throughout this disclosure it should be understood that front, forward and forwardly directions correspond to direction 70 as shown in FIGS. 1–3. Similarly, back, backward and rearwardly directions correspond to direction 71 as shown in FIGS. 1–3. It should further be understood that when any objects are termed as being longitudinally spaced, they are spaced from each along the axes of directions 70, 71. When any objects are termed as being vertically spaced, they are spaced from each along the axis of line 69 shown in FIGS. 1–2 and 4–5.

With reference to FIGS. 1–3 and 5, the riding mower 10 includes a frame 12 and an engine 16 that is operatively attached to the frame 12. The engine 16 can be of any type currently used in the art that provides locomotion to the riding mower 10. Also operatively attached to the frame 12 are first and second front wheels 18, 19 and first and second back wheels 20, 21. The first and second front wheels 18, 19 form a front wheel axis A that is longitudinally spaced by a wheel base distance WB from a back wheel axis B formed by the first and second back wheels 20, 21. The riding mower 10 also has a back axle 30 (shown in FIG. 5) that forms a back axle axis C. The back wheel axis B may be co-linear with the back axle axis C as shown in FIG. 3.

With continuing reference to FIGS. 1–3 and 5, the engine 16 is longitudinally spaced forwardly of the back axle axis C. As noted above, the engine 16 can be of any type commonly known in the art. However, in the preferred embodiment the engine 16 is a vertical shaft engine having a vertical shaft 26 (shown in dashed lines in FIG. 5). A vertical shaft engine is preferred because it inherently has a lower center of gravity than a horizontal shaft engine if they are mounted on the same surface. This is commonly known in the art. The vertical shaft 26 is longitudinally spaced forwardly of the back axle axis C by an engine axle distance EA. The engine axle distance EA divided by the wheel base distance WB forms an engine wheel base ratio EWBR. It is preferred that the engine wheel base ration EWBR be at least 0.10. It should be understood that when the engine is longitudinally spaced forwardly of the back axle axis C, the greater the engine wheel base ration EWBR, the more forward is the center of gravity of the engine 16 and thus the riding mower 10.

With reference now to FIGS. 1–4, the frame 12 may comprise first and second frame members 32, 33. In a preferred embodiment, the first and second frame members 32, 33 are formed of straight 2 inch by 2 inch structural tubing running from the front to the back of the riding mower 10. It is also preferred that the various components of the riding mower 10 that require connection to the frame 12 be welded to the first and second frame members 32, 33. In this way the structural integrity of the frame 12 is maximized. The first and second frame members 32, 33 have first and second back ends 34, 35 respectively. The first and second back ends 34, 35 are longitudinally spaced rearwardly of the back axle axis C by a frame axle distance FA (shown in FIG. 3). The frame axle distance FA divided by the wheel base distance WB forms a frame wheel base ratio FWBR. It is preferred that the frame wheel base ratio FWBR be within the range 0.00 and 0.25. In this way the first and second back ends 34, 35 do not extend a great distance in the rearward direction. However, it should be noted that the first and second back ends 34, 35 could be used to attach a bumper (not shown) a grass catcher (not shown) or any other component chosen with sound engineering judgement. The frame 12 may also include an articulating front frame member 38 that is pivotable about an articulating pin 40. The first and second front wheels 18, 19, that may be castor wheels as shown, are operatively attached to the articulating front frame member 38 and permit the riding mower 10 to travel over uneven terrain or inclined terrain while permitting the first and second front wheels 18, 19 to maintain contact with the ground.

Figure 5:
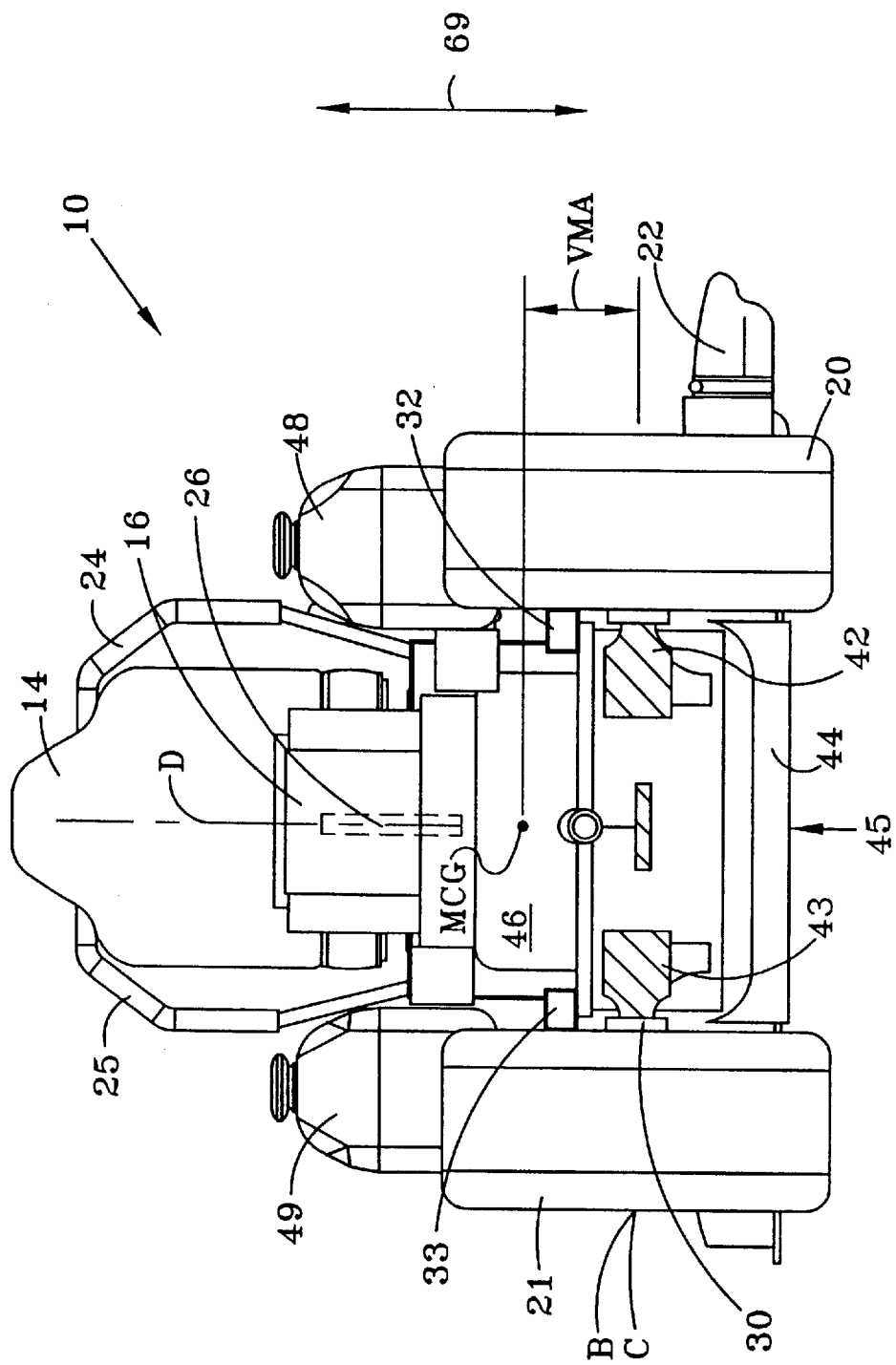
FIG. 5 is a back elevation view of the riding mower of the present invention showing the first and second hydrostatic transmissions aligned in a co-linear manner with the back axle axis.

With reference now to FIGS. 3 and 5, the riding mower 10 may also include first and second hydrostatic transmissions 42, 43. Hydrostatic transmissions, as commonly known in the art, are used to transfer power from the engine 16 to the drive wheels which in this case are the first and second back wheels 20, 21. What is believed to be novel is the positioning of the first and second hydrostatic transmissions 42, 43. The center of gravity of the riding mower 10 has been lowered by positioning the first and second hydrostatic transmissions 42, 43 co-linear with the back axle axis C. The riding mower 10 also includes a muffler 46 that has a muffler center of gravity that is shown as point MCG in the FIGURES. The muffler center of gravity MCG is longitudinally spaced rearwardly of the back axle axis C by a longitudinal muffler axle distance LMA. The longitudinal muffler axle distance LMA divided by the wheel base distance WB forms a longitudinal muffler wheel base ratio LMWBR that is preferably within the range of 0.00 and 0.10. The muffler center of gravity MCG is also spaced vertically upwardly of the back axle axis C by a vertical muffler axle distance VMA. The vertical muffler axle distance VMA divided by the wheel base distance WB forms a vertical muffler wheel base ration VMWBR that is preferably within the range of 0.00 and 0.20. In this way the center of gravity MCG of the muffler 46 is positioned downwardly and forwardly as compared to riding mowers known in the art. The riding mower 10 may also include a skid pad 44 that protects the first and second hydrostatic transmissions 42, 43 as well as the back axle 30 and other related components from damage due to rocks, roots and other such potentially damaging items (not shown). The skid pad 44 has a bottom surface 45 that is preferably smooth. This prevents the potentially damaging items from inadvertently getting stuck to the skid pad 44. Instead, the bottom surface 45 of the skid pad 44 simply slides over all such potentially damaging items as the riding mower 10 travels along.

With reference now to FIGS. 1–2, the riding mower 10 may also include an operator seat 14 having a trailing edge 15. The trailing edge 15 represents the rearward most portion of the operator seat 14. The operator seat 14 is operatively attached to the frame 12 using any manner commonly known in the art. In this way the weight of the operator seat 14 plus the weight of an operator (not shown) is transmitted to the frame 12. Thus it can be understood by those of ordinary skill in the art that the operator seat 14 will have a seat center of gravity with respect to the frame 12 shown by a point labeled SCG in FIG. 2. The seat center of gravity SCG is longitudinally spaced forwardly of the back axle axis C by a seat axle distance SA. The seat axle distance SA divided by the wheel base distance WB forms a seat wheel base ratio SWBR that is preferably within the range of 0.35 and 0.60. In this way it can be understood that the position of the operator seat 14 is forward as compared to the position of operator seats commonly known in the art. Thus, once again, the overall center of gravity of the riding mower 10 is moved forward.

With reference now to FIGS. 1–3, the riding mower 10 may also include first and second fuel tanks 48, 49 each having first and second leading and trailing edges 50, 51 and 52, 53 respectively. The first leading edge 50 of the first fuel tank 48 is the front-most portion of the first fuel tank 48 and the first trailing edge 52 is the rearward most portion of the first fuel tank 48. The second leading edge 51 and second trailing edge 53 of the second fuel tank 49 are similarly positioned. As best seen in FIG. 2, the trailing edge 15 of the operator seat 14 is longitudinally spaced forwardly of the first leading edge 50 of the first fuel tank 48. In other words, there is a distance X between the operator seat 14 and the first fuel tank 48. It should be noted that the first and second fuel tanks 48, 49 can be used to hold any type of fuel chosen with sound engineering judgement for use with the engine 16. Thus, for example, the first and second fuel tanks 48, 49 may selectively contain gasoline, diesel fuel, propane, or another fuel. The riding mower 10 also includes a mower deck 22 that is used to cut associated vegetation (not shown) in a manner well known in the art. It should be noted, as shown best in FIG. 2, that the seat center of gravity SCG is positioned vertically over the mower deck 22.

With continuing reference to FIGS. 1–3, the riding mower 10 may also include first and second control rods 24, 25 having first and second leading edges 56, 57 for use in controlling the riding mower 10. As noted above, the riding mower 10 may be a zero turn mower. In other words, the mower may have zero radius turning capabilities. In this case, the riding mower 10 has two drive wheels, first and second back wheels 20, 21, that are controlled respectively by the first and second control rods 24, 25. To make a zero radius turn it is only necessary to drive one of the drive wheels in a forward direction while simultaneously driving the other drive wheel in a backward direction. It should be noted that it is not required that the riding mower 10 be a zero turn mower for this invention. The first leading edge 56 of the first control rod 24 is longitudinally spaced forwardly of the back axle axis C by a rod axle distance RA. The rod axle distance RA divided by the wheel base distance WB forms a rod wheel base ratio RWBR that is preferably at least 0.60. In this way yet again, the center of gravity of the riding mower 10 is moved forwardly.

With reference now to FIGS. 2–3, the riding mower 10 may also include a floorboard 60 and a foot rest 62 having front and back edges 63, 64. As commonly known, the operator's feet (not shown) can be supported by either the floorboard 60 or the foot rest 62 during operation of the riding mower 10. However, the foot rest 62 is positioned forwardly of the floorboard 60 and may be angled with respect to the floorboard 60 as shown in FIG. 2. It should be noted, as seen best in FIGS. 2–3, that the front wheel axis A is positioned between the front and back edges 63, 64 of the foot rest 62. Once again, this is possible because the center of gravity of the riding mower 10 has been moved forwardly. As shown best in FIGS. 2–3, the riding mower 10 has front and back-most surfaces 66, 67. It should be noted that the first and second front wheels 18, 19 provide the front-most surface 66 while the first and second back wheels 20, 21 provide the back-most surface 67 of the riding mower 10. This design maintains a shorter overall length for the riding mower 10.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

What is claimed is:

1. A riding mower comprising:
    a frame;
    an engine operatively attached to said frame for providing locomotion to said riding mower;
    a first front wheel operatively attached to said frame, said first front wheel forming a front wheel axis;
    a first back wheel operatively attached to said frame, said first back wheel forming a back wheel axis, said back wheel axis being longitudinally spaced from said front wheel axis by a wheel based distance WB;
    a back axle forming a back axle axis, said engine being longitudinally spaced forwardly of said back axle axis, said back wheel axis and said back axle axis are collinear; and,
    a first hydrostatic transmission positioned collinear with said back axle axis.

2. The riding mower of claim 1 wherein said engine has a vertical shaft that is longitudinally spaced forwardly of said back axle axis by an engine axle distance EA, said engine axle distance EA divided by said wheel base distance forming an engine wheel base ratio EWBR, said engine wheel base ratio EWBR being at least 0.10.

3. The riding mower of claim 1 wherein said frame comprises:
    first and second frame members having back ends that are longitudinally spaced rearwardly of said back axle axis by a frame axle distance FA, said frame axle distance FA divided by said wheel base distance WB forming a frame wheel base ratio FWBR, said frame wheel base ratio FWBR being within the range of 0.00 and 0.25.

4. The riding mower of claim 1 further comprising:
    a second front wheel, said frame including an articulating front frame member, said first and second front wheels being operatively attached to said articulating front frame member.

5. The riding mower of claim 1 further comprising:
    a first control rod for use in controlling said riding mower, said first control rod having a leading edge longitudinally spaced forwardly of said back axle axis by a rod axle distance RA, said rod axle distance RA divided by said wheel base distance WB forming a rod wheel base ratio RWBR, said rod wheel base ratio RWBR being at least 0.60.

6. The riding mower of claim 1 further comprising:

an operator seat operatively attached to said frame, said operator seat having a seat center of gravity with respect to said frame, said seat center of gravity being longitudinally spaced forwardly of said back axle axis by a seat axle distance SA, said seat axle distance SA divided by said wheel base distance WB forming a seat wheel base ratio SWBR, said seat wheel base ratio SWBR being within the range of 0.35 and 0.60.

7. The riding mower of claim 6 further comprising:

a mower deck for use in mowing associated vegetation, said mower deck being operatively attached to said frame, said seat center of gravity being vertically spaced over said mower deck.

8. The riding mower of claim 1 wherein said first front wheel provides a front-most surface for said riding mower and said first back wheel provides a back-most surface for said riding mower.

9. A riding mower comprising a frame;

an engine operatively attached to said frame for providing locomotion to said riding mower;

a first front wheel operatively attached to said frame, said first front wheel forming a front wheel axis;

a first back wheel operatively attached to said frame, said first back wheel forming a back wheel axis, said back wheel axis being longitudinally spaced from said front wheel axis by a wheel base distance WB;

a back axle forming a back axle axis said engine being longitudinally spaced forwardly of said back axle axis; and, a muffler having a muffler center of gravity, said muffler center of gravity being longitudinally spaced rearwardly of said back axle axis by a longitudinal muffler axle distance AMA, said longitudinal muffler axle distance LMA divided by said wheel base distance WB forming a longitudinal muffler wheel base ratio LMWBR, said longitudinal muffler wheel base ratio LMWBR being within the range of 0.00 and 0.10.

10. The riding mower of claim 9 wherein said muffler center of gravity is spaced vertically upwardly of said back axle axis by a vertical muffler axle distance VMA, said vertical muffler axle distance VMA divided by said wheel base distance WB forming a vertical muffler wheel base ratio VMWBR, said vertical muffler wheel base ratio VMWBR being within the range of 0.00 and 0.20.

11. A riding mower comprising:

a frame;

an engine operatively attached to said frame for providing locomotion to said riding mower;

a first front wheel operatively attached to said frame, said first front wheel forming a front wheel axis;

a first back wheel operatively attached to said frame, said first back wheel forming a back wheel axis, said back wheel axis being longitudinally spaced from said front wheel axis by a wheel base distance WB;

a back axle forming a back axle axis, said engine being longitudinally spaced forwardly of said back axle axis; and, a foot rest having front and back edges, said front wheel axis being located between said front and back edges of said foot rest.

12. A riding mower comprising:

a frame;

an engine operatively attached to said frame for providing locomotion to said riding mower;

a first front wheel operatively attached to said frame, said first front wheel forming a front wheel axis;

a first back wheel operatively attached to said frame, said first back wheel forming a back wheel axis, said back wheel axis being longitudinally spaced from said front wheel axis by a wheel base distance WB;

a back axle forming a back axle axis, said engine being longitudinally spaced forwardly of said back axle axis;

an operator seat operatively attached to said frame, said operator seat having a seat center of gravity with respect to said frame, said seat center of gravity being longitudinally spaced forwardly of said back axle axis by a seat axle distance SA, said seat axle distance SA divided by said wheel base distance WB forming a seat wheel base ratio SWBR, said seat wheel base ratio SWBR being within the range of 0.35 and 0.60; and, a first fuel tank having leading and trailing edges operatively attached to said frame, said trailing edge of said operator seat being longitudinal spaced forwardly of said leading edge of said first fuel tank.

13. A riding mower comprising:

a frame;

an engine operatively attached to said frame for providing locomotion to said riding mower;

a mower deck for use in mowing associated vegetation, said mower deck being operatively attached to said frame;

a first front wheel operatively attached to said frame, said first front wheel providing a front-most surface for said riding mower;

a first back wheel operatively attached to said frame, said first back wheel providing a back-most surface for said riding mower; and, a back axle forming a back axle axis;

first and second frame members for use informing said frame, said first and second frame members having back ends that are longitudinally spaced rearwardly of said back axle axis by a frame axle distance FA, said frame axle distance FA divided by said wheel base distance WB forming a frame wheel base ratio FWBR, said frame wheel base ratio FWBR being within the range of 0.00 and 0.25;

a first hydrostatic transmission positioned collinear with said back axle axis; and, an operator seat operatively attached said frame, said operator seat having a seat center of gravity with respect to said frame, said seat center of gravity being longitudinally spaced forwardly of said back axle axis by a seat axle distance SA, said seat axle distance SA divided by said wheel base distance WB forming a seat wheel base ratio SWBR, said seat wheel base ratio SWBR being within the range of 0.35 and 0.60.

14. The riding mower of claim 13 wherein said engine has a vertical shaft that is longitudinally spaced forwardly of said back axle axis by an engine axle distance EA, said engine axle distance EA divided by said wheel base distance WB forming an engine wheel base ratio EWBR, said engine wheel base ratio EWBR being at least 0.10 said riding mower further comprising:

a muffler having a muffler center of gravity, said muffler center of gravity being longitudinally spaced rearwardly of said back axle axis by a longitudinal muffler axle distance LMA, said longitudinal muffler axle distance LMA divided by said wheel base distance WB forming a longitudinal muffler wheel base ratio LMWBR, said longitudinal muffler wheel base ratio LMWBR being within the range of 0.00 and 0.10, said muffler center of gravity being vertically spaced upwardly of said back axle axis by a vertical muffler axle distance VMA, said vertical muffler axle distance VMA divided by said wheel base distance WB forming a vertical muffler wheel base ratio VMWBR, said vertical muffler wheel base ratio VMWBR being within the range of 0.00 and 0.20.

* * * * *